United States Patent Office 3,070,577
Patented Dec. 25, 1962

3,070,577
COPOLYMERIZATION OF ALKOXYARYLETHYL-
ENES WITH ALPHA OLEFINS
Eugene L. Stogryn, Fords, and Herbert F. Strohmayer,
Roselle, N.J., assignors to Esso Research and Engineering Company, a corporation of Delaware
No Drawing. Filed Apr. 15, 1960, Ser. No. 22,395
6 Claims. (Cl. 260—62)

The present invention relates to novel copolymers and in particular to copolymers of alkoxyarylethylenes with hydrocarbon alpha olefins.

The preparation of polymers and copolymers using catalyst systems made up of reducible heavy transition metal compounds and a reducing metal containing compounds is well known to the art; see e.g. Belgian Patent 533,362, "Chemical and Engineering News," April 8, 1957, pages 12 through 16, and "Petroleum Refiner," December 1956, pages 191 through 196.

It has now surprisingly been found that copolymers of an alkoxyarylethylene and a hydrocarbon alpha olefin can be prepared with catalysts of the above general type; and the copolymers prepared thereby have unusually high resistance to ultraviolet light degradation; high tensile strengths; high melting points; and exhibit greater ease of dyeing than homopolypropylene.

The copolymers of the invention contain from 99.9 to 20, preferably 99.5 to 65 wt. percent propylene and correspondingly from 0.1 to 80, preferably from 0.5 to 45 wt. percent of an alkoxyarylethylene.

The hydrocarbon alpha olefins suitable as a component of the novel copolymers of the invention are straight or branched chain aliphatic mono-alpha olefins having from 2 to 15 carbon atoms. Examples include ethylene, propylene, butene-1, pentene-1, 3-methyl butene-1, 4-methyl pentene-1, hexene-1, and the like.

The alkoxyarylethylene component of the copolymer have the general formula:

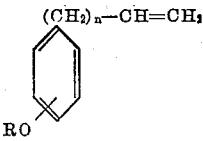

where $n=0$ to 10, R=a straight or branched chain alkyl group containing from 1 to 10 carbon atoms. The alkoxy group can be attached to any position on the ring relative to the $-(CH_2)_n-CH=CH_2$ group. The other positions on the benzene nucleus can be hydrogen, alkyl, cycloalkyl, aryl, halogen, alkoxy, aryloxy and the like. Examples include 4-methoxystyrene, 3-ethoxystyrene, 4-methoxy allyl benzene, 3-chloro-4-methoxystyrene, 2-methyl-3-chloro-4-ethoxystyrene, and the like.

The copolymerization of the monomers utilized to form the novel copolymers of the invention is carried out by reacting the desired monomers together in a polymerization zone with a polymerization catalyst at a temperature in the range of from 0° to 150° C., preferably 40 to 100° C. in an aliphatic, alicyclic, or aromatic hydrocarbon diluent, such as n-heptane, n-hexane, n-pentane, isopentane, cyclopentane, cyclohexane, benzene, methylated benzene, chlorobenzene, dichlorobenzene, etc. The pressure utilized is not important and pressures below or above atmospheric can be used although atmospheric is generally adequate. The polymerization reaction is carried out from 0.25 to 10 hours, preferably 0.5 to 3 hours until the desired monomer conversion is effected. After the polymerization reaction, polymer isolation is carried out by adding to the polymerization mixture an antisolvent such as an alcohol, e. g. methanol, ethanol, isopropyl alcohol, etc., or a ketone, e.g., acetone, methyl ethyl ketone, etc. Also, a combination of an alcohol and a ketone can be used. The anti-solvent is generally added in amounts ranging from 0.5 to 3 times the volume of the polymerization mixture. Additionally, small quantities of chelating agents such as diketones, e.g. acetylacetones, diacetyl, etc. or hydroxy carboxylic acids can be added to aid in solution and removal of catalyst components from the polymer. In general, from 0.5 to 5 wt. percent chelating agent is employed based on the weight of catalyst. The precipitated polymer is then filtered and dried. Additional processing steps known to to the polymer art such as a deashing step and the like can be employed as desired.

The low pressure polymerization catalysts useful for the present invention are those catalysts commonly used for the low pressure polymerization and copolymerization of alpha olefins, such as a catalyst system comprising a mixture of a reducing metal-containing material and a reducible heavy transition metal compound. This catalyst system can be prepared by mixing from about 0.2 to 12 parts of reducing metal-containing material per part of reducible heavy transition metal compound in an inert diluent, either by mixing the total quantities of these components together with or without pretreatment, or by using a staged reduction pretreat technique, i.e. by adding timed increments of the reducing metal-containing material to the total quantity of reducible heavy transition metal compound. Reducing metal-containing materials suitable for use as a catalyst component of this catalyst include the alkali and alkaline earth metals, their alloys, and their alkyl and/or aryl compounds; alkyl and aryl derivatives of other metals which have sufficient stability to permit reaction in their compound form with a reducible heavy metal compound, e.g. organo-aluminum compounds such as triisobutyl aluminum, tripropyl aluminum, triethyl aluminum, dialkyl aluminum halides such as diethyl aluminum halides and dimethyl aluminum halides, and methyl and ethyl aluminum dihalides. Organo-aluminum compounds with two hydrocarbon radicals or at least one hydrocarbon radical and one hydrogen and containing an electron attracting group such as an alkoxy, halogen, and organic nitrogen can be used. Mixtures of the above reducing metal-containing compounds can also be used such as mixtures containing ethyl aluminum dichloride and triethyl aluminum. The organo aluminum compounds, especially trialkyl aluminum and dialkyl aluminum halide are preferred. All of the above compounds and the methods for their preparation are well known to the art. Reducible heavy metal compounds which can be used include inorganic compounds such as the halides, oxy-halides, complex halides, oxides, hydroxides, and organic compounds such as alcolohates, acetates, benzoates, and acetylacetonates of the transition metals of the IV, V, VI, VII and VIII groups of the periodic system, and iron and copper, e.g. titanium, zirconium, hafnium, thorium, uranium, vanadium, niobium, tantalum, chromium, molybdenum, tungsten, and manganese. The metal halides, particularly the chlorides, are generally preferred. Titanium, zirconium and vanadium are the preferred metal components since they are the most active of these metals. These catalysts are prepared by intimately mixing the reducing metal-containing material and the reducible heavy metal compound in an inert diluent and in a non-oxidizing atmosphere with stirring.

Preformed catalysts can also be used, and in fact are preferred in the present invention. These catalysts are activated partially reduced heavy transition metal-compounds or activated partially reduced heavy transition metal compounds cocrystallized with a group II or III metal compound such as halides, e.g. aluminum chloride, gallium trichloride, zinc chloride, and the like. The partially reduced heavy transition metal compounds include inorganic compounds such as the halides, oxyhalides, complex halides, oxides and hydroxides, and organic compounds such as alcoholates, acetates, benzoates, and acetonates of the transition metals of the IV–B, V–B, VI–B, and VIII groups of the periodic system, according to Deming's General Chemistry (5th ed.), John Wiley & Sons, and iron and copper, e.g. titanium, zirconium, hafnium, thorium, uranium, vanadium, niobium, tantalum, chromium, molybdenum, tungsten and manganese. The metal halides, particularly the chlorides, are generally preferred; especially purple crystalline titanium trichloride. Purple crystalline titanium trichloride cocrystallized with aluminum chloride is particularly preferred. When the catalyst is a partially reduced heavy transition metal compound cocrystallized with a group II or III metal compound, the catalyst contains from 0.05 to 1.0, preferably 0.1 to 0.5 mole of the group II or III metal compound per mole of partially reduced heavy transition metal compound. The partially reduced heavy transition metal compounds can be prepared by any procedure known to the art and the preparation of these compounds is not within the scope of the invention. However, some of the methods known for preparing the preferred preformed catalyst components, i.e., purple crystalline titanium trichloride and purple crystalline titanium trichloride cocrystallized with aluminum chloride are summarized below:

(1) Reduction of titanium tetrachloride with aluminum powder in xylene at 100–175° C. at atmospheric pressure.
(2) Metal reduction of titanium tetrachloride with either aluminum powder, titanium powder, or mixtures of aluminum and titanium powder in the absence of solvent at elevated temperatures.
(3) Hydrogen reduction of titanium tetrachloride at temperatures above about 650° C.
(4) Reduction of titanium tetrachloride with metal alkyls, AlEt$_3$ in particular, in an inert diluent above about 150° C.
(5) Heating a mixture of titanium tetrachloride and an aluminum alkyl after the formation of a brown precipitate at a temperature above about 70° C. in the presence of an inert diluent.
(6) Reducing titanium tetrachloride with an aluminum trialkyl by carrying out the reduction in temperature graded stages in an inert diluent and with an aluminum trialkyl/TiCl$_4$ mole ratio of about 0.3/1.
(7) Heat reduction of titanium tetrachloride at temperatures above about 1000° C.

The above catalyst components are then activated with organo-metallic compounds, preferably organo-aluminum compounds, and especially aluminum alkyl compounds, such as alkyl aluminum halides and trialkyl aluminum, e.g. triethyl aluminum. Other organo-metallic compounds that can be used include dialkyl zinc, dialkyl magnesium, triaryl aluminum and complexes such as lithium aluminum tetraalkyl. In general, from 0.1 to 5.0 moles of the activating organo-metallic compound per mole of partially reduced transition metal halide is added to the catalyst in an inert diluent. Catalyst concentrations in the reaction mixtuure are from 0.1 to 20 g./l., preferably 0.5 to 3.0 g./l.

The novel copolymers of the invention can be used in all applications in the plastics art where polyethylene or polypropylene are used, such as, for example, in molded and extruded articles such as housewares, pipes, plastic hose and the like.

The invention will be better understood from the following examples which are given for illustration purposes only and are not meant to limit the invention.

EXAMPLE 1

A slurry of 1 g. AlEt$_3$/1 g. TiCl$_3$·⅓AlCl$_3$ catalyst in 100 mls. of xylene was added to a solution of 10 grams of 4-methoxystyrene in 900 ml. of xylene which was saturated with propylene at 25° C. At the end of the catalyst addition, the temperature of the mixture was 40° C. The temperature was then raised rapidly to 80° C. and maintained at this temperature during the polymerization. Propylene was continuously introduced during the course of three hours. At the end of this time, the polymerization mixture was cooled and 10 mls. of acetylacetone added thereto. The reaction mixture was then poured into 3 ls. of methanol, filtered, washed with a 5% hydrochloric acid-methanol solution, filtered again, and the resulting precipitate dried in a vacuum oven. Details of the polymerization are given in Table I and the properties of the copolymer product are given in Table II.

EXAMPLES II THROUGH VI

Additional reactions of 4-methoxystyrene with propylene were carried out according to the general procedure of Example I except that the concentration of 4-methoxystyrene was varied as shown in Table I; the copolymerization temperatures in Examples V and VI were higher; and the alkyl aluminum portion of the catalyst in Example VI was changed. Details of the polymerization reactions are given in Table I and the properties of the resuling product are given in Table II together with a sample of homopolypropylene prepared according to the process of Example I for comparison purposes.

*Table I*

COPOLYMERIZATION OF 4-METHOXYSTYRENE WITH PROPYLENE

| Example | Mole Fraction MeOPhCH=CH$_2$ (Feed) | Wt. of Copolymer, g. | (I.V.) | Wt. percent MeOPhCH=CH$_2$ in copolymer |
|---|---|---|---|---|
| I | 0.611 | 121.6 | 2.86 | 1.07 |
| II | 0.758 | 66.3 | 2.86 | 1.64 |
| III | 0.873 | 49.0 | 0.686 | 70.14 |
| IV | 0.924 | 66.3 | 0.723 | 88.10 |
| V | a 0.873 | 22.9 | 0.686 | 42.52 |
| VI | b 0.873 | 15.0 | 0.315 | 75.76 | a Copolymerization carried out at 129° C.
b Copolymerization carried out at 129° C. using Al(n—C$_6$H$_{13}$)$_3$.

It can be seen from the above table that copolymers of alkoxyarylethylenes with hydrocarbon alpha olefins can be prepared having a wide range of compositions.

*Table II*

4-METHOXYSTYRENE-PROPYLENE COPOLYMER PROPERTIES

| | Example | | | | | Polypropylene Homopolymer |
|---|---|---|---|---|---|---|
| | I | II | III | IV | V | |
| Wt. percent MeOPhCH=CH$_2$ in copolymer | <0.4 | 0.46 | 0.86 | 4.18 | 44.83 | 0 |
| (I.V.) | 2.79 | 3.32 | 3.75 | 2.75 | 1.52 | |
| Tensile, p.s.i. | 4,676 | 4,798 | 4,580 | 4,684 | | 4,330 |
| Percent Elongation | 167 | 30 | 30 | 20 | | 40 |
| Bell Brittleness, ° F. | | 40–60 | 50–80 | | | |
| Density | 0.9039 | 0.9031 | 0.9027 | | >0.9580 | 0.8975 |
| M.P., ° C. | 160 | 158 | 161 | 159 | 153 | 159 |
| U.V. Stability, hrs | 120 | 138 | 207 | 230 | >230 | 80 |

It can be seen from the above table that the novel copolymers of the invention have tensile strengths higher than that of homopolypropylene, having melting points of the same order of magnitude as homopolypropylene, and additionally have outstandingly high ultravoilet stability.

EXAMPLE VII 4-methoxystyrene was copolymerized with ethylene according to the process of Example I. A suspension of 2.27 g. AlEt₃/1.52 g. TiCl₃ in 100 ml. of chlorobenzene was added to a solution of 45 g. of 4-methoxystyrene in 900 ml. of chlorobenzene, at room temperature. Ethylene introduction was then started and continued during the course of two hours. After ethylene introduction was begun the temperature was rapidly raised to 87° C. and maintained at this temperature during polymerization. The reaction mixture was cooled, and 25 ml. of acetylacetone was added. The reaction mixture was then poured into 2.5 l. of hot acetone, filtered, and stirred with 3 l. of hot acetone. The dry weight of polymer was 122.5 g. Subjecting the copolymer to a hot acetone extraction (to remove homopoly-4-methoxystyrene) for 20 hours resulted in a weight loss of 0.22%. Quantitative ultraviolet analysis of the extracted copolymer showed the copolymer to contain 1.22 wt. percent of the 4-methoxystyrene group.

Homopoly-4-methoxystyrene is a very hard brittle polymer melting about 125° C. Hence, it can be seen from the above examples that the copolymers of the invention have properties superior to the homopolymers of both of the components.

The copolymers of the invention can be further modified by halogenation, sulfohalogenation, sulfonation, nitration, acylation, and reaction with curing agents such as sulfur, dimethylol phenol resins, dicumyl peroxide, and the like, i.e. those commonly employed in the synthetic rubber art. Additionally, the copolymers of the invention can be mixed with inert fillers such as silica, mica, carbon black, etc. They can be extended with oils and/or stabilized with antioxidants according to the techniques known to the synthetic rubber and plastics industry.

Variations in the process of the invention can be undertaken without departing from the scope and spirit of the invention.

What is claimed is:

1. The process for preparing an improved copolymer comprising the steps of reacting an alkoxyarylethylene having the formula

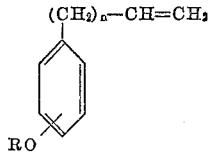

wherein $n=0$ to 10 and R is an alkyl group containing from 1 to 10 carbon atoms, and (2) from 99.9 to 20 wt. percent of an aliphatic alpha olefin having from 2 to 15 carbon atoms in an inert diluent at a temperature of from 0 to 150° C. with a catalyst comprising a transition metal compound of a transition metal of groups IV–B, V–B, VI–B and VIII of the periodic system and a reducing metal hydrocarbon compound of a metal of groups I through III to form said copolymer; and isolating said copolymer from the reaction mixture.

2. The process of claim 1 wherein the catalyst comprising a trialkyl aluminum and a partially reduced titanium halide cocrystallized with an aluminum halide.

3. The process of claim 1 wherein said aliphatic alpha olefin is propylene.

4. The process of claim 2 in which the alpha olefin is propylene and alkoxyarylethylene is 4-methoxystyrene.

5. A copolymer of claim 1 wherein said alpha olefin constituent is propylene.

6. The copolymer of claim 5 wherein the alkoxyarylethylene is 4-methoxystyrene.

References Cited in the file of this patent

UNITED STATES PATENTS 2,522,501    Brooks et al. _____ Sept. 19, 1950
2,597,493    Hwa _____ May 20, 1952

OTHER REFERENCES

Marvel et al.: J. Pol. Science, IV, 703–707 (1949).